United States Patent [19]

Smith et al.

[11] Patent Number: 5,260,814

[45] Date of Patent: * Nov. 9, 1993

[54] PRODUCTION OF FULL COLOR STEREOGRAPHIC HOLOGRAMS

[75] Inventors: Steven L. Smith, Chicago; Tung H. Jeong, Lake Forest, both of Ill.

[73] Assignee: Advanced Holographic Imaging Technologies, Inc., Chicago, Ill.

[ * ] Notice: The portion of the term of this patent subsequent to Jun. 11, 2008 has been disclaimed.

[21] Appl. No.: 863,228

[22] Filed: Apr. 3, 1992

Related U.S. Application Data

[60] Continuation of Ser. No. 679,909, Apr. 3, 1991, Pat. No. 5,134,504, which is a division of Ser. No. 429,990, Nov. 1, 1989, Pat. No. 5,022,727.

[51] Int. Cl.$^5$ .................. G03H 1/26; G03H 1/30
[52] U.S. Cl. ........................... 359/23; 359/12; 359/26; 359/27
[58] Field of Search .................. 359/12, 23, 26, 27

[56] References Cited

U.S. PATENT DOCUMENTS 5,022,727  6/1991  Smith et al. .................. 359/23
5,134,504  7/1992  Smith et al. .................. 359/12

Primary Examiner—Bruce Y. Arnold
Assistant Examiner—Darryl J. Collins
Attorney, Agent, or Firm—Welsh & Katz, Ltd.

[57] ABSTRACT

A method and apparatus for producing temporally coherent, full color holograms is disclosed whereby a linear array of stereographically positioned cameras are simultaneously triggered to obtain a temporally coherent sequence of full color exposures. The exposures are then sequentially exposed upon an H1 plate using multiple wavelength, "white" laser light to obtain a virtual full color hologram image in a single step operation.

5 Claims, 3 Drawing Sheets

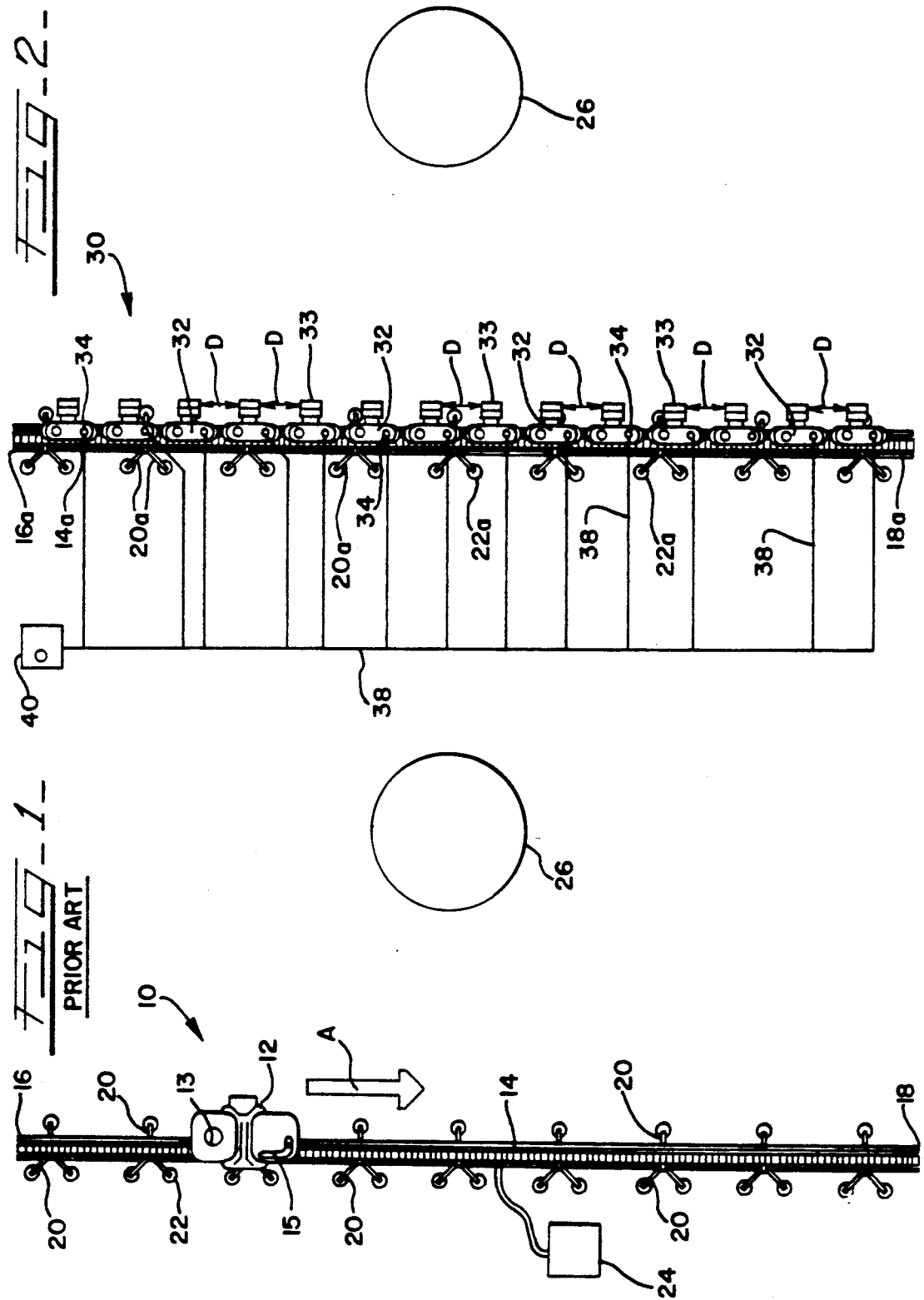

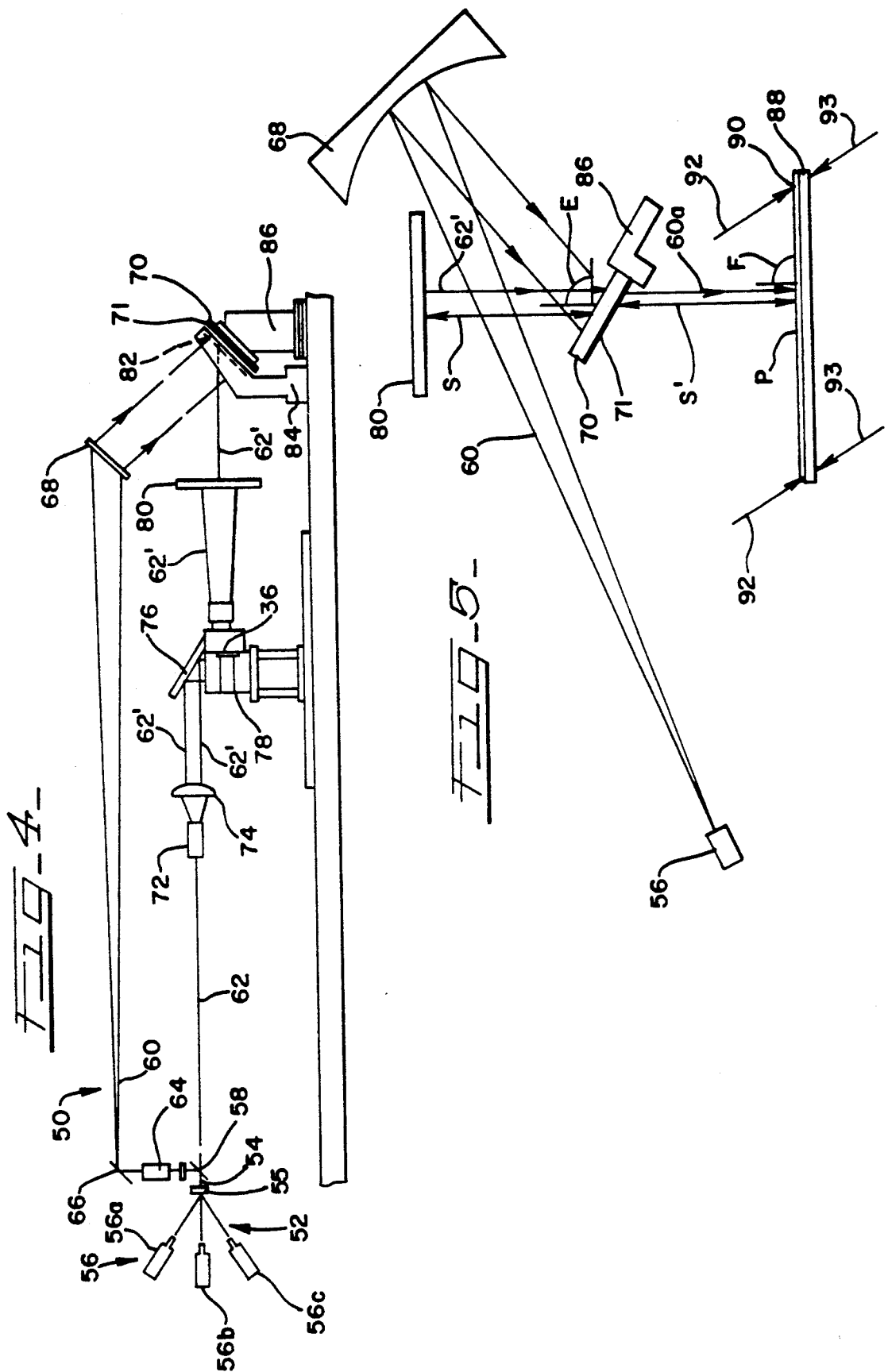

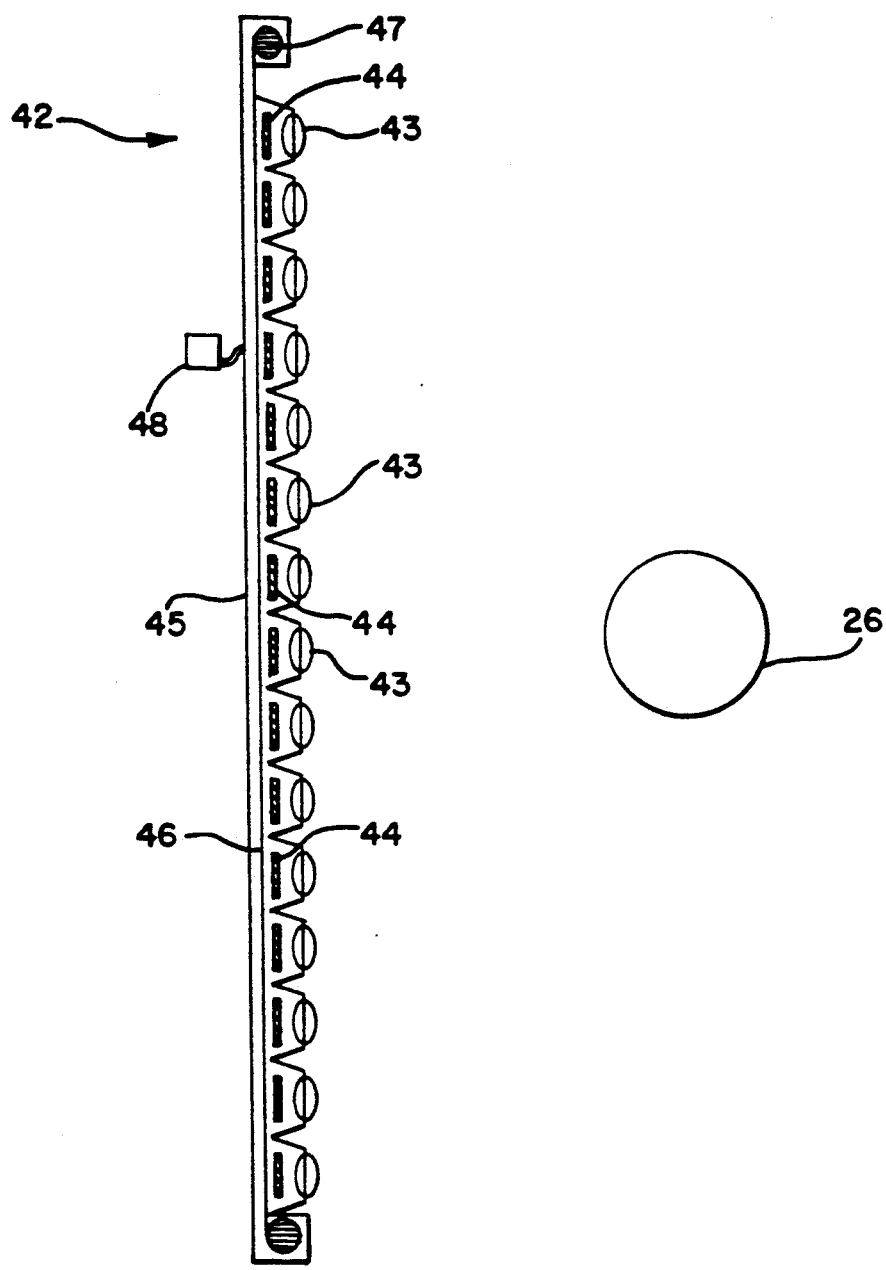

PRODUCTION OF FULL COLOR STEREOGRAPHIC HOLOGRAMS

This is a continuation of application Ser. No. 07/679,909, filed Apr. 3, 1991, now issued as U.S. Pat. No. 5,134,504 which is a division of Ser. No. 07/429,990, filed Nov. 1, 1989, now U.S. Pat. No. 5,022,727, issued Jun. 11, 1991.

BACKGROUND OF THE INVENTION

The present invention relates to the production of holograms, and specifically concerns a method and apparatus for producing stereographically correct, temporally coherent, full color hologram images.

Conventional methods of producing holograms derived from a two-dimensional image or pattern which is resolvable into a three-dimensional image often involve the obtaining of a photographic image of a subject using a single camera mounted on a rail for linear movement. The rail is positioned a desired distance from the subject so that the subject is located approximately midway between the ends of the rail. As the camera moves along the rail from one end to the other, a sequence of exposures of different views of the subject is taken. These exposed images are then sequentially projected by a source of coherent light upon an H1 plate in the presence of a reference beam to obtain an H1 hologram. The H1 is subsequently transferred to an H2 plate for completion of the hologram.

A significant disadvantage of this method of obtaining multiple views of the subject is that the exposures are temporally incoherent. In other words, because the images were taken at different times, a margin of error is introduced into the photographic process, whereby different lighting conditions, vibration of the camera as it moves along the rail, or slight movement of live subjects may cause some distortion of the final H1 image.

Another disadvantage of conventional holographic rail camera systems is that the movement of the camera along the rail requires the camera to be set at a faster shutter speed to avoid "image smear". Further, artificial lighting is often required to accommodate the faster shutter speed. Thus, the actual lighting conditions of the subject cannot be reproduced by existing rail camera systems.

Yet another disadvantage of conventional stereograph holographic systems is that when the sequence of exposed photographic images of the subject is projected upon an H1 plate using a conventional optical printing system, a single wavelength of laser light is used as the source of coherent light. Thus, even if color film were used in the conventional rail camera in photographing the subject, the single wavelength laser light source would produce a monochromatic H1 image. When a color hologram is desired, the color is derived through a multi-step color separation under white light illumination. This process results in distortions in the colors and in the alignment of the images, some of which cannot be optically removed. Further, the linear movement of the rail camera precludes the production of a truly stereographically correct final hologram.

Thus, there is a need for a holographic production system in which an instantaneous, point-in-time sequence of images of a subject is produced to result in a temporally coherent, stereographically correct hologram. There is also a need for a holographic production system capable of producing an original full color holographic image of a subject in its naturally lit environment.

SUMMARY OF THE INVENTION

Accordingly, the present invention provides a method and apparatus for producing temporally coherent, full or real color holograms. More specifically, the present system includes the use of a linear array of preferably stereographically positioned cameras or shuttered lenses disposed to simultaneously photograph a subject from several positions to obtain a temporally coherent image. The cameras are preferably equipped with color film. The array of cameras/lenses produces a linear sequence of exposed images. Since the cameras do not move, they may be set at a slower shutter speed to accommodate less than ideal lighting conditions. The natural lighting conditions of the subject are thus preserved.

After exposure by the camera array, the sequence of exposed images is then placed in a projector. A coherent light source, preferably a white laser light comprising at least the primary red, green and blue wavelengths is split into a projection beam and a reference beam. The projection beam is passed through the projector and is projected to a specified size upon a rear projection screen. The projected image is then combined with the reference beam to play one exposure of the film sequence upon a masked H1 plate in full color, the exposure of the image on the H1 plate being performed in a single operation. The mask and the film sequence are linearly advanced and exposed on the H1 plate in this manner until the entire filmed image sequence is exposed or imaged onto the H1 plate. The H1 plate containing the multiple images is then transferred to an H2 plate to form a full color virtual image and thus complete the hologram process.

BRIEF DESCRIPTION OF THE DRAWINGS

FIG. 1 is a diagrammatic overhead plan view of a prior art holographic rail camera;

FIG. 2 is a diagrammatic overhead plan view of the multiple camera array of the invention;

FIG. 3 is a diagrammatic overhead plan view of an alternate embodiment of the array shown in FIG. 2;

FIG. 4 is a partial diagrammatic right side elevational view of the optical printer system of the invention; and FIG. 5 is a partial diagrammatic view of the optical printer system of the invention.

DESCRIPTION OF THE PREFERRED EMBODIMENT

Referring now to FIG. 1, a prior art rail camera system of the type used to produce sequential images of a subject is generally designated 10. The system 10 includes a camera 12, which is preferably provided with an automatic shutter trigger 13 and a film advance 15. The camera 12 is mounted upon an elongate optical rail 14 for linear driven movement in the direction of the arrow A between the first and second ends 16, 18, respectively, of the rail 14. The rail 14 is supported by a plurality of legs 20, and may be releasably fixed to a substrate through the use of a corresponding plurality of feet 22. The movement of the camera 12 upon the rail 14, and the operation of the shutter trigger 13 and the film advance 15 is controlled by a conventional electronic control circuit designated by the box 24.

When it is desired to obtain a sequence of exposures, such as of a preferably three dimensional subject 26, the rail 14 is positioned relative to the subject so that the subject is generally equidistant from each of the first and second rail ends 16, 18. Ideally, the camera 12 travels from the first end 16 to the second end 18, taking a specified sequence of exposures as it progresses to the second end 18. In this manner, multiple views of the subject 26 are obtained from a variety of perspectives. The disadvantages of the system 10 include the fact that a certain amount of tim elapses as the camera 12 travels along the rail 14 from the first end 16 to the second end 18. Should the subject 26 move slightly, or any other photographic parameter change along the course of travel of the camera 12, the exposed images obtained will not be in register, which is desired for producing sharp, high resolution holographic images. The prior art system 10 thus produces temporally incoherent images. Furthermore, in that the camera 12 is in motion, it is difficult to accurately actuate the shutter trigger 13 so that the exposures are taken at stereographically correct positions, i.e., placed so as to approximate the distance between the eyes of the individual observing the subject from the position of the camera 12. Also, the movement of the camera requires that the shutter speed be set at a relatively fast setting to avoid a blurred or smeared image. Artificial lighting is often required to accommodate the faster shutter speed. Thus, the natural lighting characteristics of the subject are lost.

Referring now to FIG. 2, the multiple lens exposure system of the invention is generally designated 30. The components of the system 30 which are substantially similar to corresponding components of the system 10 have been designated by the same reference number with a subscript "a". The system 30 includes at least two and as many as 120 lens units 32. In the preferred embodiment, each lens unit 32 is a camera including a lens 33 and an electronically activated shutter trigger 34. A preferred type of camera 32 is a 35 mm single lens reflex, although the use of other types of cameras is contemplated. The cameras 32 are linearly arranged upon an optical rail 14a having first and second ends 16a, 18a, respectively, and being supported by a plurality of legs 20a. The cameras 32 are stereographically spaced from each other on the rail 14a and are secured thereto so that a distance "D" between any two lenses 33 will enable the lenses to approximate the view from the eyes of an individual observing the subject from the location of the respective cameras 32. Each leg 20a is provided with a foot 22a which may be used to releasably secure the rail 14a to a substrate relative to the subject 26. The cameras 32 are preferably equipped with positive color or panchromatic film 36, (best seen in FIG. 4), such as KODACHROME film, (Eastman Kodak, Rochester, N.Y.); however, the use of other types of film is contemplated. A control cord 38 connects the shutter trigger 34 of each camera 32 to a multiple shutter control unit 40. The control unit 40 is configured to provide a specified sequence of signals to the shutter triggers 34 to obtain a corresponding sequence of exposures taken by the cameras 32. A preferred sequence of signals will result in simultaneous triggering of all the cameras 32, although other triggering sequences are contemplated. Also, the fixed position of the cameras 32 means that a slower shutter speed may be used, thus capturing the natural lighting conditions of the subject.

The preferred sequence of exposures taken of the subject 26 will result in multiple views of the subject at a particular instant in time and under particular conditions, so that the exposure taken by each camera 32 will be temporally coherent with those taken by the other cameras in the system 30. In this manner, when the exposures are placed side-by-side in a linear arrangement corresponding to the relative positioning of the cameras 32, and are sequentially projected upon an H1 plate, a three-dimensional stereographic hologram image may be generated in which the subject 26 is clearly seen from a variety of positions.

Referring now to FIG. 3, an alternate embodiment of the present lens exposure system is depicted, and is generally designated 42. The system 42 basically includes a linear array of lenses 43, each having a shutter 44 associated therewith. The shutter 44 may be placed in any photographically functional position relative to the lens 43. The lenses 43 are linearly arranged within a light-tight housing 45. A single length of film 46, which may be part of a roll 47, is positioned behind the lenses 43 to be exposed by an image projected by the lens. The shutters 44 are all controlled by an automatic shutter release 48 which may be located remote from the housing 45. The system 42 may be positioned relative to the subject 26 in a similar fashion to the system 30.

Referring now to FIG. 4, the exposed film 36 from the multiple camera system 30 is placed in an optical printer system, generally designated 50. In the system 50, a laser light 52 of specified frequency is introduced at point 54 by a laser unit 56. The preferred type of laser light 52 is generated by a combination of light from three units 56a, 56b, 56c, each emitting light at a distinct wavelength. Preferably, the primary red, green, and blue wavelengths, i.e., 630, 540 and 450 nm, respectively, will be emitted, which, when combined into a single beam by a holographic multiwavelength beam combiner 55, result in a full color or "white" laser light 52. It is contemplated that additional laser units 56 emitting light at additional wavelengths may also be used in the formation of the white laser light 52.

In the present method, the use of the "white" laser light 52 in combination with the color film 36 will result in a full or "real-life" color hologram. At point 54, the beam of laser light 52 is split by a beam splitter 58 into a reference beam 60 and a projection beam 62. The reference beam 60 is passed through a spatial filter 64 to diverge the beam up to a specified diameter, and is deflected by a mirror 66 to a holographic optical element 68 to the collimate the reference beam 60. The reference beam 60 then intersects with an H1 holographic plate 70 at an angle "E" of approximately 50°-55°, with 53° being preferred (angle E best seen in FIG. 5). The H1 holographic plate 70 is basically a clear plate coated with a light sensitive emulsion 71 on one side thereof.

After being split from the reference beam 60, the projection beam 62 is passed through a spatial filter 72 and then through a collimating lens 74. The lens 74 forms the beam 62 into a beam of parallel rays 62', which are deflected by a mirror 76 into a projector 78. In the preferred embodiment, the projector 78 is a Forox Model SD 35 mm camera (Forox, Stamford, Conn.), which has been adapted to act as a projector, although the use of other projectors is contemplated. The sequence of exposed film 36 from the camera system 30 (best seen in FIG. 2) is inserted in the projector 78 in a top-to-bottom inverted orientation to be in the path of the beam 62'. The projector 78 projects the images from the film 36 and sizes them to a specified dimension upon and through a rear projection screen 80, preferably a POLARCOAT brand screen (Polaroid Corp., Cambridge, Mass.). The screen 80 is positioned a distance "S" (best seen in FIG. 5) from the projector 78 to obtain an image of specified dimensions.

The image passed through the screen 80 is projected in full color through a slitted mask 82 covering the H1 plate 70 to expose a portion of the plate. The mask 82 is secured upon a slit advance 84, preferably a UNIS-LIDE brand advance (Velmex, East Bloomfield, N.Y.). The slit advance 84 is reciprocally movable along a horizontal line which is perpendicular to the beam 62 as it is projected upon the screen 80. An H1 plate holder 86 secures the H1 plate in a fixed position during the plate exposure process. The exposed film 36 is advanced linearly through the projector 78 so that each image is sequentially projected through the screen 80 and upon the H1 plate 70. With each successive image, the slit advance 84 is advanced across the plate 70 so that the images are linearly exposed thereon in a corresponding, i.e. stereographically dimensioned, sequence to that of the exposed film 36. Through the use of the "white" or full color laser light beam 52, which is split into the reference beam 60 and the projection beams 62 and 62', a series of full color images are exposed upon the H1 plate, each in a single step procedure. This is a significant improvement over prior procedures, where the conventional multi-step color separation process is both time consuming and results in the distortion of both colors and images.

Referring now to FIG. 5, it will be seen that an H2 plate 88 is positioned at a distance "S'" from the H1 plate 70. The distance S' is equal to the distance S between the screen 80 and the H1 plate 70. The H2 plate 88 is also disposed at an angle "F" relative to the projection beam 62' being emitted through the H1 plate 70. In the preferred embodiment, the angle F may be in the approximate range of 32° to 50°. The H2 plate 88 is a sheet of rigid material covered with a photosensitive emulsion 90. The H1 plate 70 is inverted front-to-back so that the emulsion 71 faces the H2 plate 88. Thus, when the plate 70 is illuminated by the reference beam 60, the inversion of the plate 70 causes the phase conjugate 60a of its reference beam 60 to project the image from the H1 plate upon the H2 plate 88. A virtual image of the sequentially exposed screen positions is thus projected out at a point P, located at the same distance S' from the H1 plate as the distance S between the screen 80 and the H1 plate 70. When white light is projected upon the H2 plate 88 from an orientation indicated by the arrows 92, a full color transmission or "backlit" hologram will be visible, in which the subject 26 is sharply depicted, without the distortion inherent with previous holographic procedures. In the alternative, if white light is projected upon the H2 plate from an orientation indicated by the arrows 93, a full color reflection hologram will be visible.

Although it is preferred that the optical printer system 50 is used with color film 36 which has been exposed through the multiple camera system 30, it is contemplated that color exposures produced by the system 10 may also be employed; however, it will be appreciated that a temporally incoherent holographic image will result.

While a particular embodiment of the present method and apparatus for producing full color stereographic holograms has been shown and described, it will be appreciated by those skilled in the art that changes and modifications may be made thereto without departing from the invention in its broader aspects and as set forth in the following claims.

What is claimed is:

1. An apparatus for photographically recording temporally coherent images of multiple views of a subject for use in producing a stereographically correct, temporally coherent hologram, comprising:

a multiple lens exposure system having a plurality of lenses, each said lens having a shutter associated therewith, and means for triggering each of said shutters, said lenses being disposed relative to the subject so that said lenses all face a front side and are trained in the general direction of the subject;

each of said lenses being disposed in a specific spaced relationship relative to the adjacent lenses in a stereographic arrangement to approximate the stereoscopic view from the eyes of an individual observing the subject from the location of the respective lenses; and means for controlling the triggering of said shutters to obtain multiple, temporally coherent exposures of the subject, so that when such exposures are placed side-by-side in an arrangement corresponding to the relative positioning of said lenses, and are sequentially projected within a holographic optical printer wherein a light sensitive holographic plate is positioned to be exposed to an interference pattern created by the interference of a reference beam and an object beam thereupon, the object beam being directed upon and through said multiple coherent exposures in sequence, the reference beam being coherent to said object beam, so that a temporally coherent, stereographically correct image of the subject is obtained, the spacing of said lenses being designed so that said multiple coherent exposures have a spacing corresponding to a desired spacing of images projected upon the holographic plate.

2. The apparatus as defined in claim 1, further including an elongate support means having a first end, a second end, a front side and a rear side.

3. The apparatus as defined in claim 2 wherein said support means is an optical rail.

4. The apparatus as defined in claim 1 wherein said triggering means is adapted to simultaneously trigger all of said shutters.

5. The apparatus as defined in claim 1 wherein each said lens and associated shutter is a camera.

* * * * *